(12) United States Patent
Loubet (10) Patent No.: US 7,940,049 B2
(45) Date of Patent: May 10, 2011

(54) PORTABLE WIRELESS METAL DETECTOR

(76) Inventor: Alain Loubet, Mervilla (FR)

(*) Notice: Subject to any disclaimer, the term of this patent is extended or adjusted under 35 U.S.C. 154(b) by 428 days.

(21) Appl. No.: 12/117,800

(22) Filed: May 9, 2008

(65) Prior Publication Data

US 2009/0009173 A1    Jan. 8, 2009

(30) Foreign Application Priority Data

May 11, 2007    (FR) ...................................... 07 55006

(51) Int. Cl.
*G01V 3/10*    (2006.01)
(52) U.S. Cl. ......................................................... 324/326
(58) Field of Classification Search .................. 324/323, 324/326, 327, 328, 329; 340/551
See application file for complete search history.

(56) References Cited

U.S. PATENT DOCUMENTS

| | | | |
|---|---|---|---|
| 3,471,773 A * | 10/1969 | Penland | 324/329 |
| 5,138,262 A | 8/1992 | Podhrasky et al. | |
| 5,696,490 A | 12/1997 | Maloney | |
| 7,081,754 B1 * | 7/2006 | Harris | 324/329 |

FOREIGN PATENT DOCUMENTS

DE    196 52 977    4/1998

* cited by examiner

*Primary Examiner* — Kenneth J Whittington
(74) *Attorney, Agent, or Firm* — Lowe Hauptman, Ham & Berner, LLP (57) ABSTRACT

A portable electromagnetic metal detector includes a detection head placed at the end of a support stick. The detection head includes a transmitting coil and a receiving coil. The metal detector has, an electronic command and control box making it possible to operate the detection head. An operator headset is provided for allowing the detector to transmit an audio detection signal to the operator. According to the invention, the generation of the transmission signal and the analysis of the received signal are made in the detection head. The detection head, the electronic box and the operator headset furthermore linked two by two by a multipoint wireless communication network. This wireless communication network advantageously makes it possible to provide a detector that does not include any wired links and to implement the detector according to the invention in various configurations including the three elements or not.

7 Claims, 6 Drawing Sheets

PORTABLE WIRELESS METAL DETECTOR

RELATED APPLICATIONS

The present application is based on, and claims priority from, French Application Number 07 55006, filed May 11, 2007, the disclosure of which is hereby incorporated by reference herein in its entirety.

FIELD OF THE INVENTION

The present invention relates to the general field of metal detection by means of electromagnetic detectors. It relates more particularly to portable apparatus operating at low frequencies, commonly used to search for and discern metallic objects that are buried or masked by vegetation covering the ground. Such detectors are essentially used for leisure, to search for coins, jewels, treasures, but also by professionals for mine-clearance, ballistics searches, or else to search for polluting metallic pipelines or particles in industry and the food sector.

BACKGROUND OF THE INVENTION

The metal detectors most commonly used, notably for leisure, use the now well-known principle of measuring the phase between an alternating electromagnetic signal transmitted by a coil energized by an electric voltage, and the signal received by another coil close to the first. In this type of apparatus, the two coils are coupled in such a way that the signal received by the receiving coil is zero when no metallic element is placed in the field of the transmitting coil. The frequency of the signal transmitted by the transmitting coil is generally less than 100 khz.

These detectors are customarily composed of 3 parts:
a detection head,
a support stick, which may or may not be telescopic,
an electronic control box.

Very generally, the detector also comprises an audio headset which allows the electronic control box to transmit an audible signal to the operator when a metallic object is detected.

In this type of equipment the detection head generally takes the form of a disc which essentially contains the detection coils. Accordingly, the excitation signal sent to the transmitting coil as well as the signal received by the receiving coil are conveyed by an electric cable between the detection head and the control box.

The detection head is generally fixed in a removable manner to a telescopic support stick, which comprises a holding handle for the use of the operator who can thus walk along while moving the detection head above the ground.

Generally, the control box contains the major part of the electronic circuits making it possible to generate the excitation signal and to perform the reception and the processing of the signal detected by the receiving coil, the analysis of the signal received making it possible to determine the nature of the corresponding metals. It also contains the batteries necessary for the operation of the assembly.

Depending on the product considered, the control box can be positioned on the support stick, facing the user, so as to allow him to access this box with the hand not mobilized by holding the equipment. The control box furthermore comprises, usually, a loudspeaker and an audio output making it possible to connect a headset.

With the aim of decreasing the weight carried by the support stick and of increasing the handleability of the detection head, certain equipment offer a carrying bag in which the control box can be housed and carried slung over the shoulder by the operator. In this way, the support stick is advantageously made lighter and more handleable. Conversely, the necessary linking of the box with the detection head compels the installation of a longer electric linking cable, then intended to hang by the side of the operator and which is at risk of catching on vegetation in the case where the search for metal is performed in an area of dense and bushy vegetation.

More generally, although apparently being the simplest to implement, the use of electric cables to link various elements of the detector and enable them to communicate with one another turns out to be to blame for often not-inconsiderable drawbacks to use.

Thus the cable linking the detection head to the control box is a bulky and fragile element which gives rise to multiple inconveniences during use, folding up of the stick, stowing of the apparatus and generally during fitting and dismantling operations.

Likewise, when the user wishes to change detection-disc diameter to accommodate the terrain or the targets to be detected, he must then dismantle the connector which links the cable to the electronic control box and undo the ties which hold the cable to the support stick, this being lengthy and irksome.

Likewise again, in the case where the electronic box is worn on a belt or slung over the shoulder, the cable remains hanging between the top of the telescopic stick, along which it runs as far as the detection head and the box which is then not fixed to the stick. It can therefore get caught on multiple obstacles, making for example searching difficult in a bushy area or forest. Furthermore, when the user has to dig up the ground to extract a metallic target, he is still linked to the stick by the cable, thereby limiting him in his movements.

Likewise again, detectors being by nature perpetually in motion in often difficult outdoor conditions, the cable and its connection facility are severely tested and regularly break down. Repair then requires a return to the workshop. To limit these breakdowns, one is constrained furthermore to use particularly strong, and therefore expensive, connection elements and to take particular care over the installation of these connecting elements during the manufacture of the detector, thereby giving rise to significant labour costs in so far as this connection facility over which care was taken is fitted manually.

Finally, it should be noted that, from the electronic standpoint, the cable is not an innocuous element. It may even be a nuisance component in the detection-signal-processing chain, all the more so since it is usually connected to the transmission and reception oscillating circuits. Noise or couplings may then occur between these various conductors. The cable may also, in the guise of metallic element, be detected by the detection head, notably if it is placed too near the latter. These problems add constraints that must be taken into account by the manufacturer during development.

U.S. Pat. No. 5,696,490 describes a detector using very high frequencies (VHF) to detect metal, and proposes that the problems generated by the cable be solved by replacing the wired link with an infrared-wave wireless link.

However, in the detector presented, the reception and display system described as being positioned at the bottom of the detection stick, in front of the disc, this not affording any benefit in terms of simplification or integration. Moreover, in the device presented, several leads are nevertheless necessary for linking inter alia the coils to the receiver box.

U.S. Pat. No. 5,138,262 describes for its part a detachable system for housing batteries that can be worn on a belt, making it possible to lighten the detector and to reduce the user effort. However, even if this system somewhat lightens the load supported at the end of the arm by the user and thus somewhat eases the handling of the detector, the user remains despite everything, in such a configuration, linked and attached to the detector by a bulky cable which limits him in these movements notably when he has to bend down to dig or enter bushy areas.

SUMMARY OF THE INVENTION

An aim of the invention is to solve the various problems of manufacture, use and reliability of the cable and the connection facility that are generally posed by the metal detectors available on the market.

For this purpose the subject of the invention is a portable metal detector, of the type comprising:
- a support stick,
- a detection head placed at the end of the support stick, the said comprising an transmitting coil and a receiving coil, the transmitting coil being energized by an excitation signal,
- an electronic command and control box making it possible to implement the detection head, and to utilize the information originating from this detection head,
- an operator headset allowing the detector to transmit an audio detection signal to the operator.

This detector has the advantageous characteristic that the detection head additionally comprising power supply means and means for generating in an autonomous manner an excitation signal, the detection head and the electronic command and control box comprise radio transmission means for establishing a bidirectional radio link, the said link allowing the command and control box to control the implementation of the detection head and allowing the detection head to transmit the detection signal to the command and control box.

The device according to the invention advantageously makes it possible to eliminate the drawbacks related to the wired link linking mainly the detection head to the control box of the detector.

According to the invention, the power supply means and means for generating in an autonomous manner an excitation signal are arranged in the detection head so as to limit the disturbances affecting the reception signal.

In a preferred embodiment, the various elements of the device according to the invention are designed to operate according to two alternative operating modes:
- an operating mode with complete hardware configuration, with command and control box and operator headset, in which the detection head is implemented by way of the command and control box.
- an operating mode with lightweighted hardware configuration, without command and control box, in which the detection head is implemented by way of the operator headset.

In this preferred embodiment, the operator headset furthermore comprises radio transmission means for establishing a bidirectional link with the command and control box on the one hand and with the detection head on the other hand.

According to a particular mode of implementation, the control of the device by the operator by means of the headset is activated when the device operates in the lightweighted configuration, as a consequence of an action of the operator.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
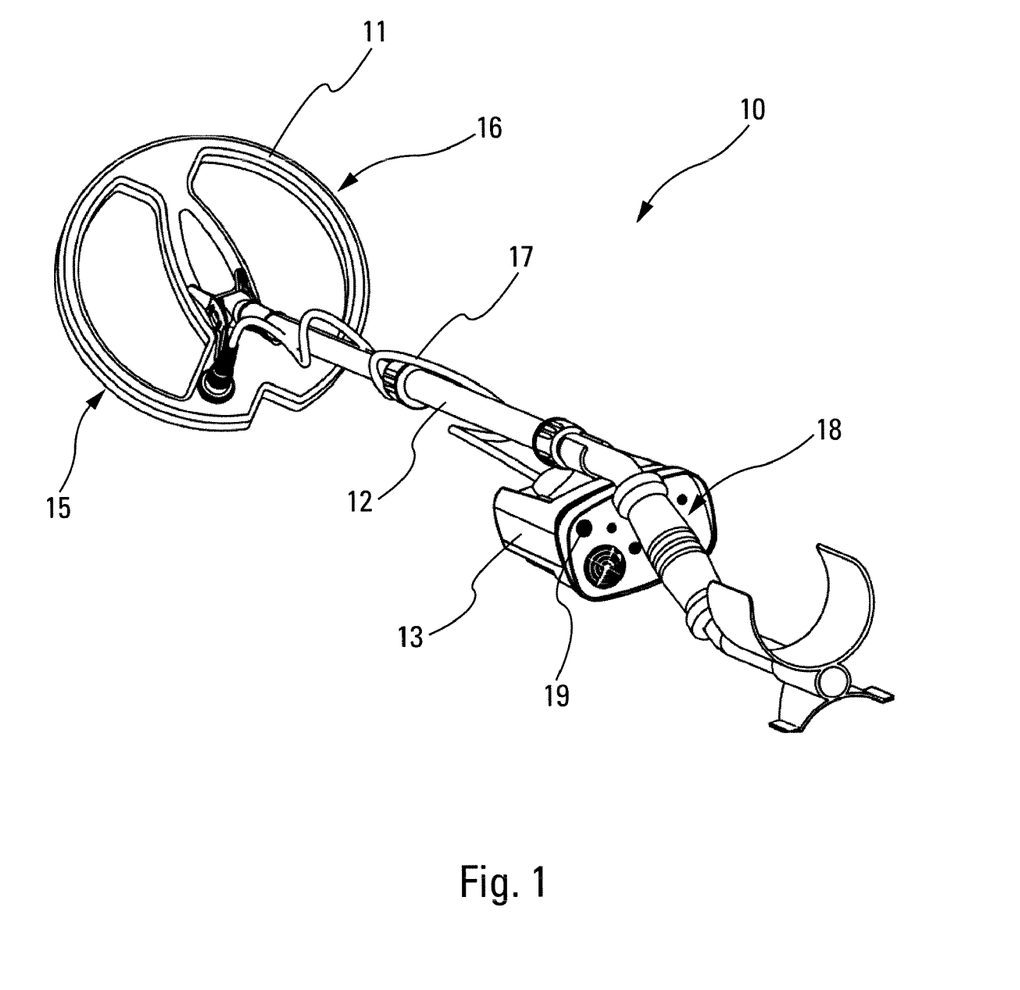
FIG. 1, a metal detector according to the prior art.

As stated previously a conventional metal detector 10 comprises, as illustrated by FIG. 1:
- a detection head 11;
- a support stick 12, generally telescopic, of ergonomic form;
- a control box 13, generally mounted on the support stick;
- an audio headset 14 for the operator (not represented in the figure).

Generally, the detection head 11 comprises only few elements. These are mainly a transmission coil 15, a reception coil 16, and a few signal tuning and/or shaping components. The coils are arranged in such a way that in the absence of metal, the field inside the reception coil is zero. The excitation signal applied to the transmission coil is produced by the electronics situated in the control box 13 by a wired electrical downlink which links the box to the detection head. Likewise, the detection signal produced by the reception coil is sent to the control box by a wired electrical uplink. The two wired links are moreover generally housed in one and the same link cable 17, which runs along the support stick 12.

The control box 13 for its part comprises the essential part of the operating members of the detector. It thus ensures both the synthesis of the excitation signal, and also the reception and processing of the detection signal or else also the provision of electrical energy for the assembly. It is also equipped with knobs and/or switches, as well as viewing means (pilot lights, monitor, display, buzzer or loudspeaker) so as also to provide the physical interface 18 with the user.

The audio headset 14 is intended to provide the operator with an audible information cue characterizing the detection of an object by the detector. This audible signal is generally synthesized by the control box on the basis of the detection signal received from the detection head, by means of an audio interface circuit. The headset is provided with a linkup cable which is wired up to an audio output 19 envisaged for this purpose on the control box.

Figure 2:
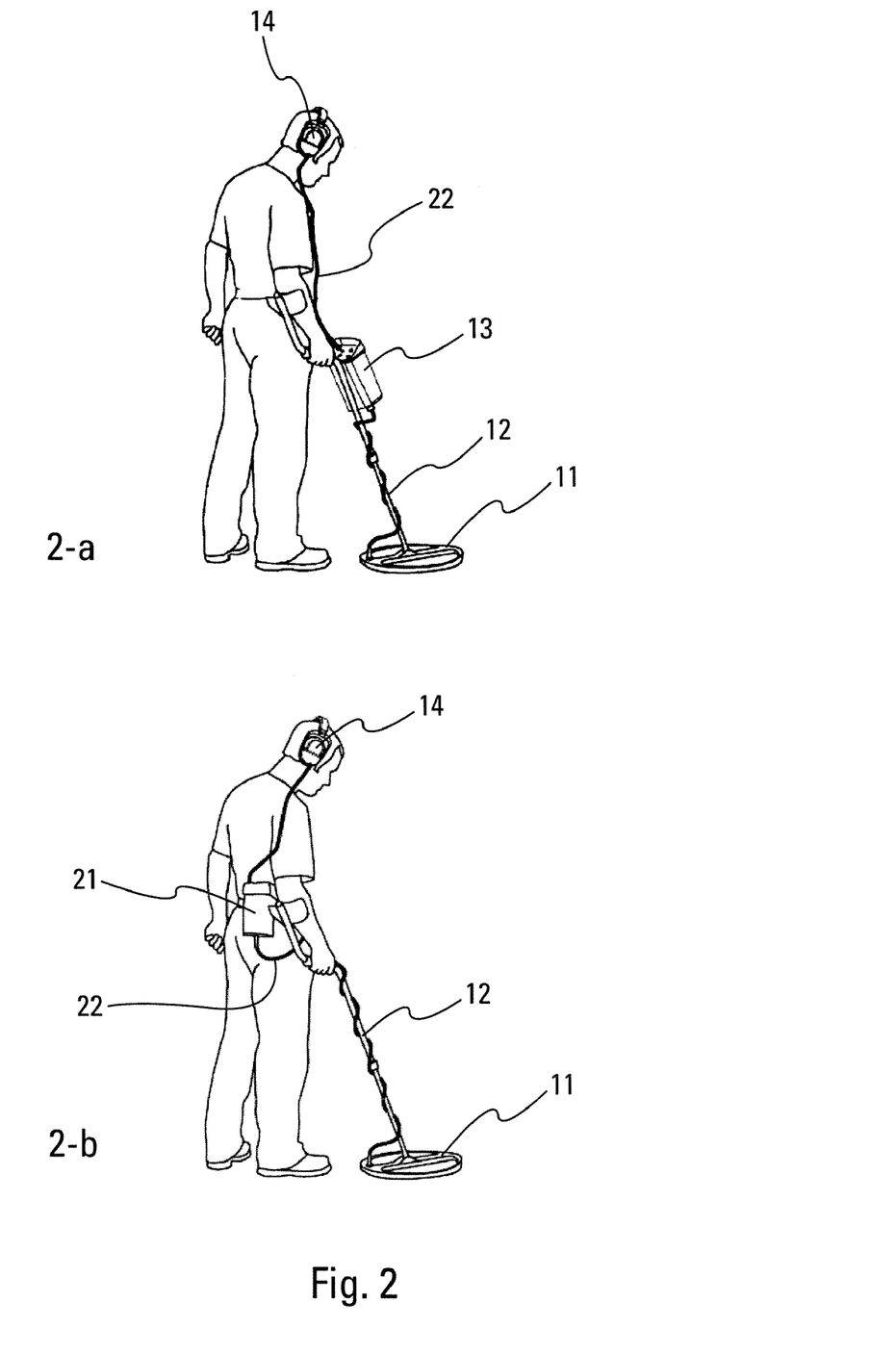
FIG. 2, illustrations showing an operator equipped with a metal detector according to the prior art.

In a conventional metal detector, the control box represents the central sub-assembly of the device. In this respect it encloses the essential part of the electronic functions, the power supply batteries, and the operator interface functions. The other elements, devoid of any autonomy, are thus necessarily connected to it. Generally positioned on the support stick, as illustrated by FIG. 2-*a*, it can however often be separated therefrom to facilitate manipulation of the latter. It is then placed, as illustrated by FIG. 2-*b*, in a receptacle 21, bag or the like, carried by the operator. The link between the box and the detection head is then achieved by means of a cable extension 22, hanging in a sufficiently slack manner to allow the operator to move the stick 12 (and therefore the detection head 11) without hindrance.

The need to allow the detection head to be changed as a function of the search performed, as well as to allow the control box to be dismantled, requires that removable electrical links be made. For this purpose the link cable is generally equipped at one of its ends with a connector making it possible to connect it to the corresponding base of the control box 13. The other end, linked to the detection head, enters the latter through a non-dismantleable leaktight passage (gland).

The cable thus being secured to the detection head, the breakage of the cable or of one of its conductors, at the level of the lower part of this cable, generally requires the replacement of the entire detection head, unfortunately a frequent intervention. The connection means furthermore represent, in many cases, the main fragile elements of the detector and are a significant cause of non-operation. Moreover, the cable itself being, in the case when the control box is held by the user, sufficiently slack not to hinder the handling of the detection head, it is also potentially subject, in numerous circumstances, to stretching or indeed tearing constraints.

Figure 3:
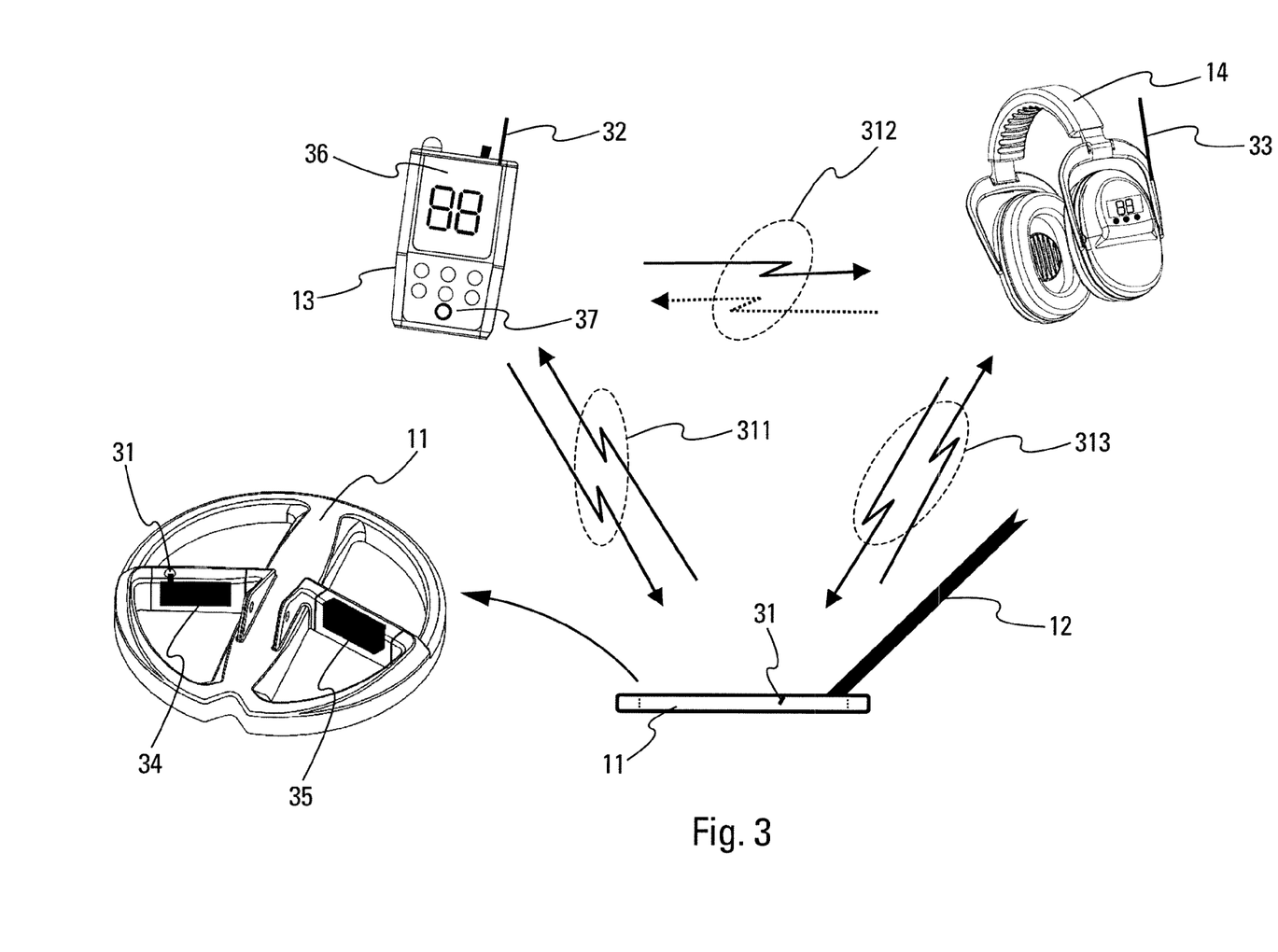
FIG. 3, a diagrammatic representation of the device according to the invention, in its overall hardware configuration.

The structure and the principle of operation of the metal detector according to the invention make it possible mainly to solve all the problems related to the use of an electrical link cable for ensuring the necessary signal exchanges between the control box 13 which carries the user interface and the detection head 11. FIG. 3 presents the various elements of this structure in a diagrammatic manner.

Like a conventional metal detector, the metal detector according to the invention comprises a detection head 11 placed at the end of a support stick, a command and control box 13 as well as an audio headset 14. However, according to the invention, the signal exchanges between the detection head 11 and the command and control box 13 are achieved not by wired link, but by a radio link symbolized by the arrow 311 in FIG. 3. For this purpose the detection head 11 and the command and control box 13 are provided with the appropriate transmission-reception means, symbolized by the antennas 31, 32, which antennas may of course be conspicuous as in the figure, or else housed in the various elements 11, 13 and 14 of the detector. Furthermore, in so far as the device according to the invention is equipped with an audio headset which itself comprises an transmitter-receiver, symbolized by the antenna 33, the signal and information exchanges between the detection head and the audio headset on the one hand and between the command and control box and the audio headset on the other hand are achieved respectively by radio links symbolized by the arrows 312 and 313 in FIG. 3.

According to the invention, the radio links 311, 312 and 313 are defined so as to ensure optimal transmission as a function of the propagation medium considered. Thus in an aquatic medium, a low-frequency radio link may be employed while for an application in a terrestrial medium a higher frequency band will be preferred. For example for devices intended for the European and North-American markets, a frequency of the order of 2.4 GHz can be used, because of the availability of the frequency band concerned, of the presence on the market of miniaturized transmission-reception components operating at this frequency and of the low electrical consumption of these components.

In the complete hardware configuration of the device corresponding to FIG. 3, a configuration which comprises an audio headset 14 equipped with an transmitter-receiver, the means of radio communication of the detection head, of the command and control box and of the audio headset are designed in such a way that the detection head 11 can exchange signals and information with the command and control box 13 (link 311) and exchange signals and information with the audio headset 14 (link 313). Furthermore, these communication means allow the command and control box 13 to exchange signals and information directly with the audio headset 14 (link 312). According to the embodiment considered, these exchanges can be achieved through point-to-point radio links, or else by multiplexing on a unique link, one of whose elements ensures management. The device according to the invention then takes the form of a multipoint wireless communication network.

The substitution of a radio link 311 for the wired link linking the command and control box 13 to the detection head 11 induces in a direct manner a noticeable modification of the physical distribution of the various functional elements. Specifically, to meet energy consumption constraints, which are obvious since this is a portable item of hardware, the radio means implemented are of low power.

Accordingly, the synthesis of the excitation signal initially carried out in the control box is here carried out directly at the level of the detection head 11, which comprises notably electronic means for carrying out this synthesis, as well as an inherent power supply source (batteries). In this way, the command and control box 13 now transmits to the detection head 11 only control and configuration signals which are received and processed by an electronic management circuit also located in the detection head. Conversely, the detection head 11 also comprises electronic means for performing, itself, the reception of the detection signal.

In the configuration illustrated by FIG. 3, these reception means integrate means for digitizing and processing the signal received, means also housed within the detection head 11. The detection signal is then processed and the information obtained by processing is transmitted in digitized form to the command and control box 13. In this configuration the detection head itself produces the audio detection signal that it transmits to the audio headset 14 by radio link.

However, in an alternative embodiment, the reception means with which the detection head is equipped simply perform the sampling of the signal received, the transposition of this signal into radio frequency and the transmission, in analogue or digitized form, of the modulated raw signal to the command and control box 13 which thus ensures the processing thereof. The audio detection signal is thus produced at the level of the command and control box which transmits it to the audio headset 14.

Hence, in the detector according to the invention, the functions ensured by the command and control box relate mainly to the collection of information and the management of the user interface. For this purpose, it comprises inputting and viewing means allowing the operator at one and the same time to define the operating mode of the detector and to take cognizance of the information derived from the signal received and transmitted by the detection head. These inputting and viewing means are associated with an electronic processing circuit housed inside the box 13. These means consist for example, as illustrated by FIG. 3, of a graphical or alphanumeric display 36 associated with a keypad 37, the assembly having appropriate dimensions for installation on one of the faces of the box 13.

To these interfacing functions can furthermore be added, in the event that a simple version of the detection head 11 is used, such as that previously described, functions for processing the raw signal transmitted by the detection head, which functions make it possible to produce an information cue that can be displayed on the screen of the user interface, as well as an audio signal for the headset 14.

In a yet more elaborate variant of the device according to the invention, the detection head can comprise, in addition to the reception means, means making it possible to locally check its operating state, on power-up (autotest), when requested by the operator (test off line), or while operating (test on line) and the state of charge of the batteries which provide the power supply.

The check results are transmitted to the command and control box 13 by radio link (link 311) together with the detection information, extracted by processing the signal received by the reception coil 16. They can furthermore be accompanied by an information cue making it possible to identify the type of the detection head implemented. These items of information are conditioned so as to be able to be displayed permanently or when requested by the operator.

Likewise the audio headset 14 can comprise means making it possible to locally check its operating state, in particular the state of charge of the batteries used for its inherent power supply. The results of the check are then transmitted, by radio link (link 312), to the command and control box 13 which conditions them for display.

To integrate the various elements necessary for its autonomous operation, in particular the elements necessary for the power supply (batteries), the means for synthesizing the excitation signal of the transmission coil, the means for detecting the signal received by the reception coil, as well as the radio transmission-reception means, the detection head 11 presents certain structural dispositions which afford housing spaces 34, 35 and in which these various elements are housed and arranged. The arrangement is achieved in such a way as to limit as far as possible the disturbances caused to the fields respectively transmitted and received by the coil 15 and the coil 16.

To this end the plane of the electronic circuit is, for example, positioned so as to be oriented at 90° to the plane of the coils so as not to disturb the electromagnetic coupling between the transmitting coil and the receiving coil.

Likewise, the power supply consists for example of a miniature rechargeable battery, of lithium technology, likewise inserted into the detection disc so as to supply the electronic circuit. The battery is chosen to be of small thickness and is positioned at 90° to the plane of the coils so as not to disturb the electromagnetic coupling between the transmitting coil and the receiving coil.

To implement the structure described, each of the active elements of the device according to the invention (detection head 11, command and control box 13 and audio headset 14) comprises appropriate electronic means. Hence the device according to the invention can be illustrated from the functional viewpoint by the schematic diagram of FIG. 4, which diagram describes the device in its complete hardware configuration, as illustrated by FIG. 3.

Figure 4:
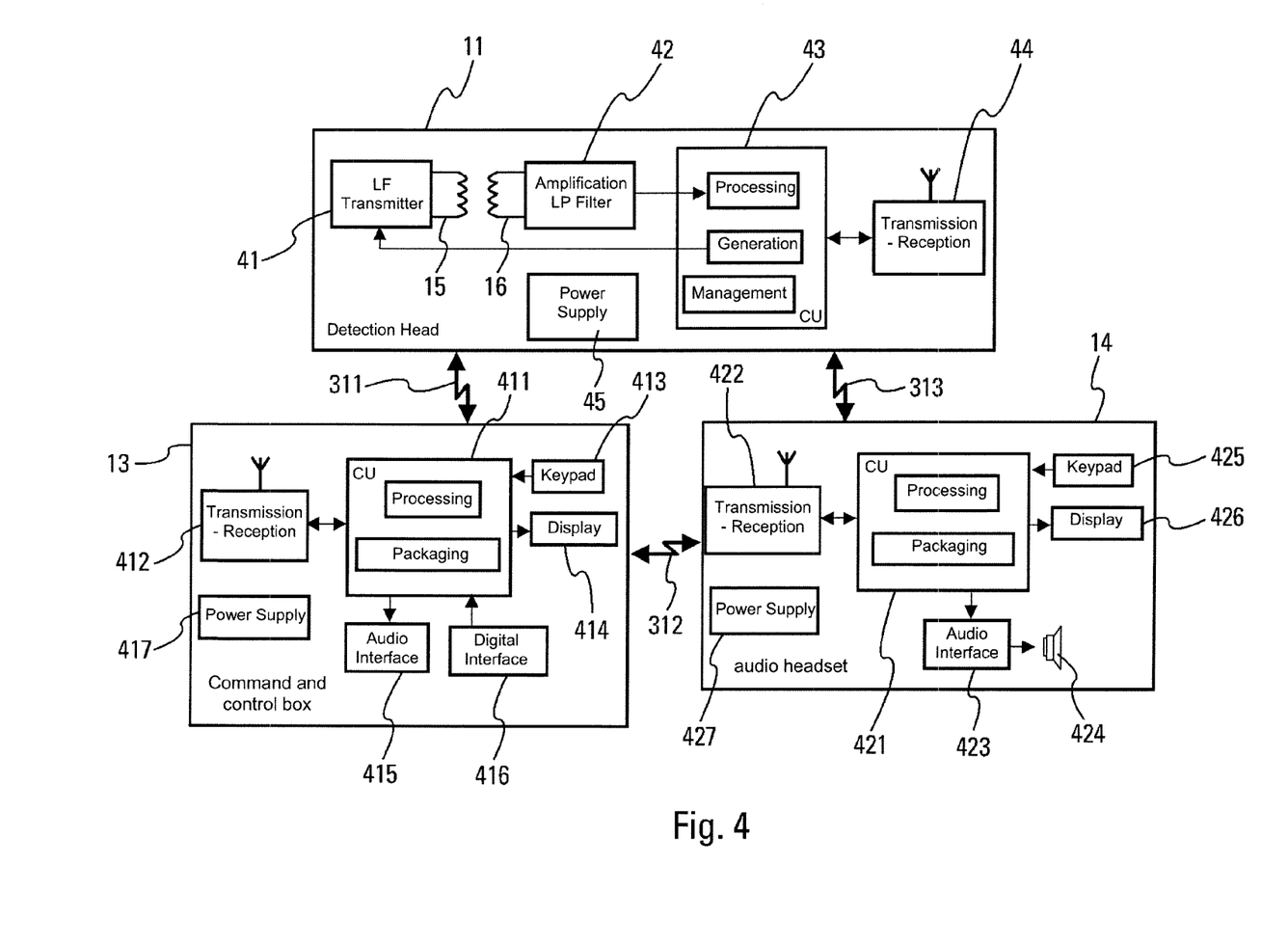
FIG. 4, a basic schematic of the various functions implemented by the various elements of the device according to the invention.

As illustrated by FIG. 4, the detection head 11 mainly comprises:
- a low-frequency (LF) transmitter stage 41 which provides the excitation signal to the transmitting coil 15,
- an amplification stage 42 which amplifies the signal sensed by the receiving coil 16,
- a central unit 43,
- an transmitter-receiver module 44
- power supply means 45.

The main original characteristic of the detection head consists in that it integrates, in addition to the means 41 for producing the excitation signal applied to the transmitting coil 15 and the means 42 for amplifying and demodulating the signal received by the receiving coil 16, a central unit 43, an transmitter-receiver module 44 and inherent power supply means 45.

The command of the coil excitation signal is here synthesized by the central unit 43 and applied to the low-frequency transmission stage 41 which drives the transmitting coil 15. The form of the control signal applied is dependent on the configuration message transmitted by the command and control box 13 and received by the central unit 43 via the transmitter-receiver module 44.

The central unit 43 also performs the digitization and processing of the signal obtained at the output of the amplification and filtering stage 42. It transmits to the command and control box 13, via the transmitter-receiver module 44 and the link 311, a set of data relating notably to the amplitude of the signal received and to its phase with respect to the reference constituted by the signal transmitted by the transmitting coil 15.

The central unit 43 furthermore performs the general management of the various electronic sub-assemblies contained in the detection head 11. In this respect it checks the proper operation of the various sub-assemblies, the state of charge of the batteries in particular, and transmits a state information cue to the command and control box, via the transmitter-receiver module 44 and the link 311.

The command and control box 13 mainly encloses the sub-assemblies necessary for achieving the interface between the detector and the operator who uses it. For this purpose it comprises notably an autonomous power supply 417, as well as a central unit 411 linked to a transmitter-receiver module 412, to a keypad 413, to a display 414 and to an audio interface 415. The main function of the central unit 411 is to achieve the interface between the operator and the detector. For this purpose it performs the acquisition of the commands input by the user by way of the keypad 413, performs the conditioning thereof and dispatches the corresponding control messages to the detection head via the transmitter-receiver module 412. Conversely, the central unit performs the acquisition of the information dispatched by the detection head, and formats this information so as to be able to present it in the appropriate form on the display.

Associated with an audio interface 415, the central unit 411 also achieves, accessorily, the synthesis of an audio detection signal, which signal can be used when the operator does not wish to make use of a wireless audio headset, but rather of a conventional headset supplied through an audio wired link. For this purpose, the command and control box 13 is provided with an audio output of loudspeaker type, and also with an audio output socket (not represented in the figures), to which the operator can connect the socket of his headset.

Associated with a digital interface, a serial input-output port for example, and with the appropriate connection facility, the central unit 411 advantageously offers the possibility of carrying out the transfer of data to remote equipment or else the acquisition of data from this equipment. In particular, this interface advantageously makes it possible to carry out a software update of the configuration of the detector by simple downloading.

Finally, like the central unit of the detection head 11, that of the command and control box 13 carries out general check functions and in particular checks for proper operation of the various sub-assemblies with which this box is equipped. It furthermore generates an operating-state information cue which is displayed in the appropriate form on the display 414.

Figure 6:
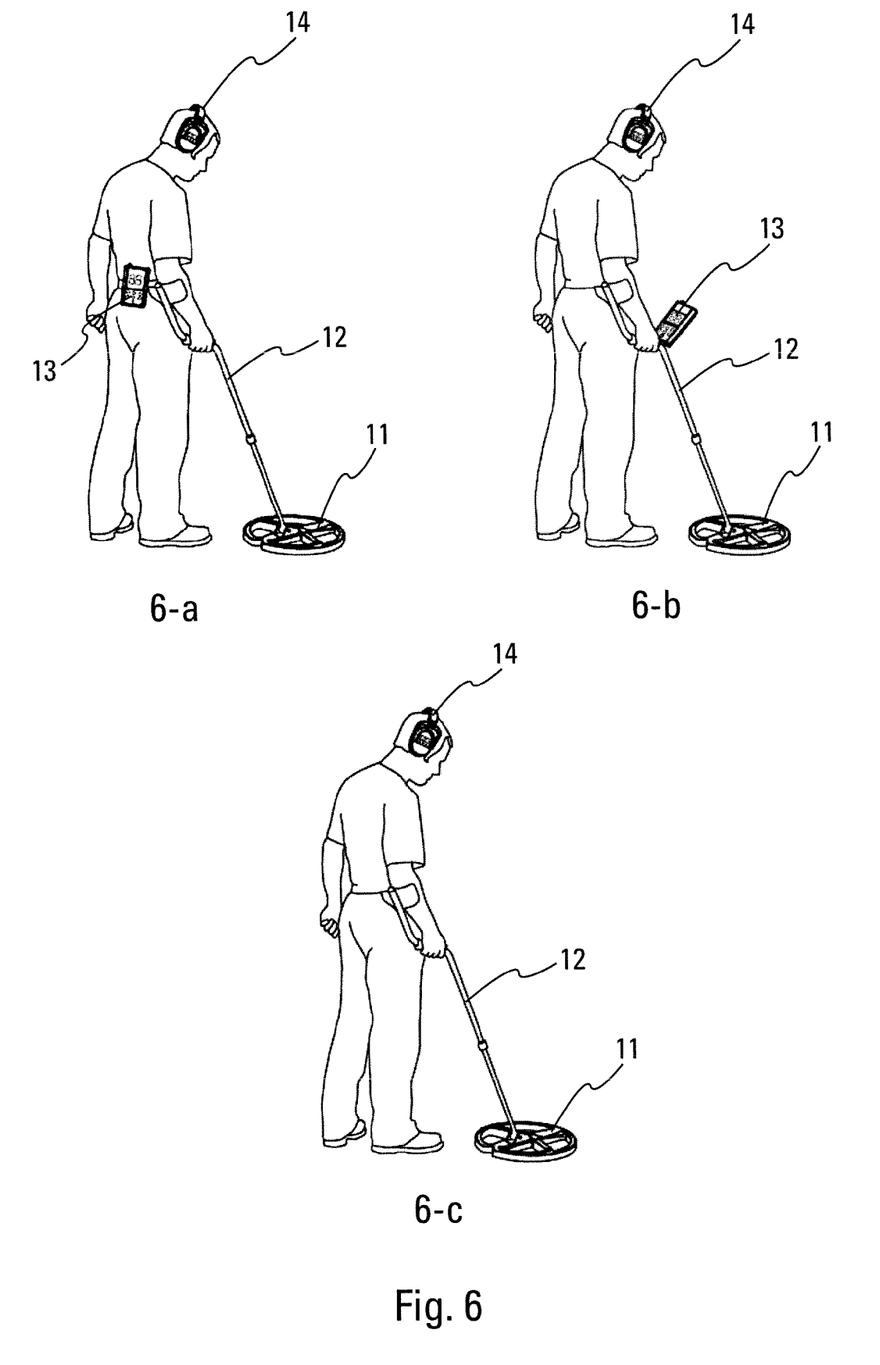
FIG. 6, illustrations relating to the implementation of the device according to the invention.

As illustrated by the representations 6-a and 6-b of FIG. 6, the box 13 according to the invention can equally well be positioned on the support stick 12 or be carried slung over the shoulder by the operator. The implementation of radio links between the box 13 and the other elements 11 and 14 of the detector advantageously makes it possible to circumvent the constraints related to the implementation of wired links.

The main characteristic of the operator headset 14 is to comprise, in addition to radio transmission means 422, a central unit 421 which associated with a simplified user interface, consisting of a miniaturized keypad 425 and miniaturized display 426, very advantageously makes it possible to use the metal detector according to the invention in a simplified configuration described subsequently in the document. It also comprises autonomous power supply means 427 (batteries).

In the complete hardware configuration, such as illustrated by FIGS. 3 and 4, the main role of the central unit of the headset is to perform the acquisition of the detection information cue transmitted by the detection head 11 via the radio link 313 and the transmitter-receiver module 422. This information cue is converted by the audio interface 423 into an analogue signal applied to the earphones 424 of the headset. The central unit also checks for proper operation of each of the sub-assemblies with which the headset is equipped and transmits an operating-state information cue to the command and control module 13, via the transmitter-receiver module 422 and the radio link 312.

Figure 5:
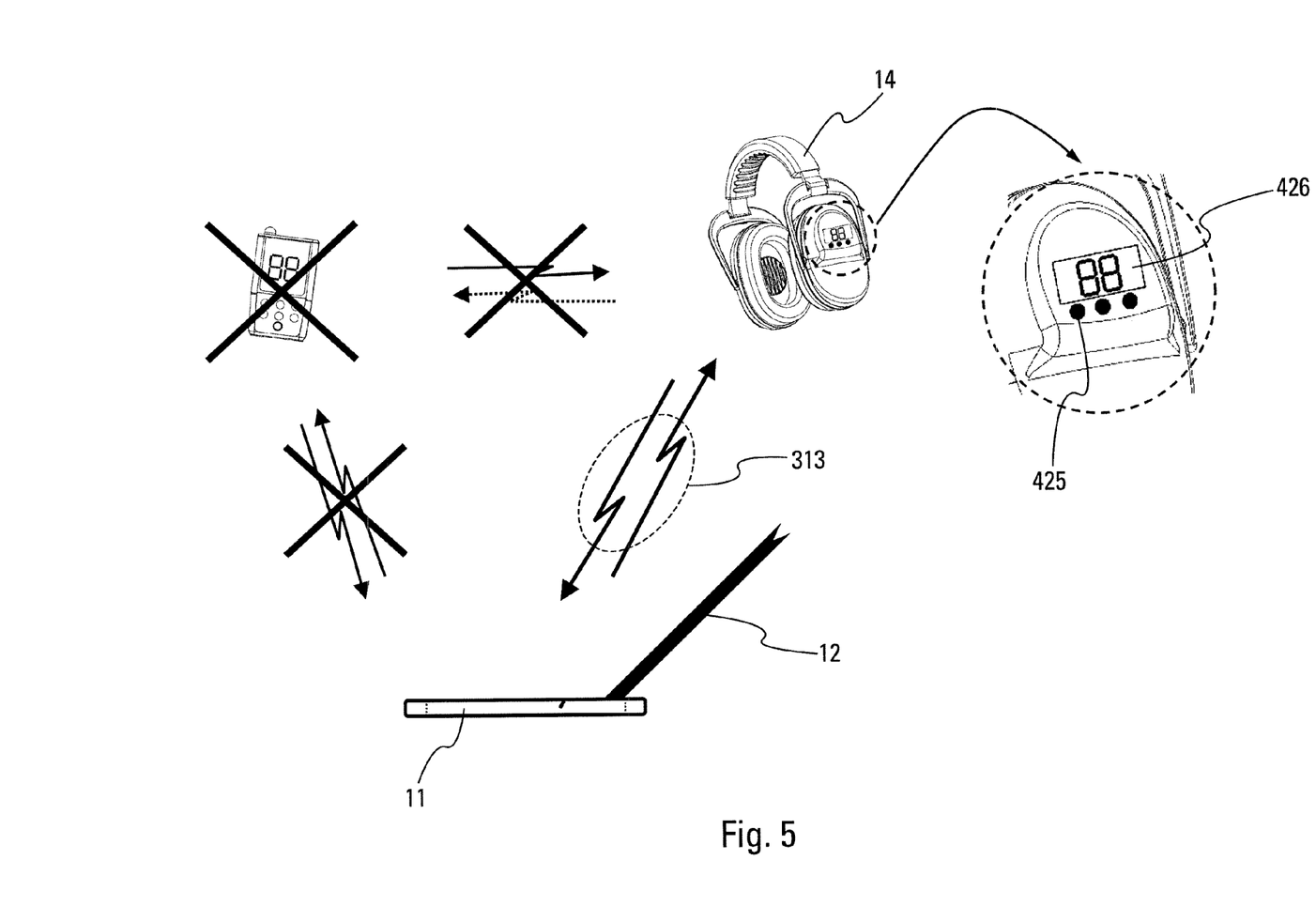
FIG. 5, a diagrammatic representation of the device according to the invention, in a simplified hardware configuration corresponding to an alternative mode of operation to that illustrated by FIG. 3.

In parallel with the complete hardware configuration which has just been described, configuration illustrated by FIGS. 3 and 4. Both the hardware and functional architecture of the metal detector according to the invention advantageously makes it possible to implement this detector with a simplified hardware configuration, which addresses in particular certain specific circumstances in which the operator does not wish to use the command and control box, for example so as not to expose the latter to damage or else to simplify or lighten the configuration when this seems necessary to him. This simplified configuration is illustrated by FIG. 5 and the illustration 6-c of FIG. 6.

The implementation of a simplified configuration in which the command and control box 13 is absent or simply taken out of service results in practice from a choice by the operator. However, it is obviously possible to extend the implementation of such a configuration to circumstances in which the command and control box having broken down, the detector continues to operate without the latter by automatically switching to an operating mode compatible with a simplified hardware configuration.

With such a hardware configuration all the signal and information exchanges are carried out by means of a single radio link, the link 313, the other links (311 and 312) being, in fact, non-existent. Thus, the detection head 11 transmits to the audio headset 14 not only the detection information cue necessary for regenerating the audio signal applied to the earphones 424 of the headset, but also the information relating to the phase shift measurement carried out on the signal received, as well as the information cue regarding the operating state of its various sub-assemblies. Conversely, the audio headset transmits to the detection head commands relating to the operating mode imposed by the operator. Furthermore it achieves the physical interface with the operator who can thus advantageously view a certain amount of information on the miniature screen with which the headset is equipped and transmit a certain number of commands to the detector by way of the miniature keypad. However, on account of the smallness of the interface elements, keypad and display, the amount of simultaneously consultable information as well as the number of commands accessible through the miniature keypad is then deliberately simplified so that the equipment retains a certain degree of ergonomics.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A portable metal detector, comprising:
   a support stick,
   a detection head placed at an end of the support stick, said detection head including a transmitting coil and a receiving coil, the transmitting coil being energized by an excitation signal,
   an electronic command and control box configured to implement the detection head,
   an operator headset configured to allow the detector to transmit an audio detection signal to the operator,
   wherein the detection head, furthermore comprises
      power supply means,
      means for generating in an autonomous manner an excitation signal and
      means for analysing the signal received, wherein the detection head, the electronic command and control box comprise radio transmission means for establishing bidirectional radio links, wherein the detection head is configured to exchange signals and information with the command and control box and with the operator headset separately, the radio transmission means is also configured to allow the command and control box to exchange signals and information directly with the audio headset.

2. The device according to claim 1, wherein the power supply means and the means for generating in an autonomous manner an excitation signal are arranged so as to limit the electromagnetic coupling induced by said two means between the transmitting coil and the receiving coil.

3. The device according to claim 1, wherein the command and control box, the detection head and the operator headset are configured to operate according to two alternative operating modes:
   an operating mode with lightweighted configuration, without command and control box, in which the detection head is implemented by way of the operator headset and transmits the detection signal thereto;
   an operating mode with complete hardware configuration, with command and control box and audio headset, in which the detection head is implemented by way of the command and control box, the detection signal being transmitted to the command and control box and to the headset.

4. The device according to claim 3, wherein the operator headset comprises simplified command and control means as well as display means, said two means allowing the operator to implement the device solely with the aid of the headset.

5. The device according to claim 3, wherein the control of the device by the operator by means of the headset is activated when the device operates in the lightweighted configuration, as a consequence of an action of the operator.

6. The device according to claim 3, wherein, in the operating mode with complete hardware configuration, the radio link means for the operator headset, the detection head and the command and control box are configured to establish on the one hand a bidirectional link between the command and control box and the head, and on the other hand a bidirectional link between the command and control box and the operator headset.

7. The device according to claim 3, wherein, in the operating mode in complete hardware configuration, the operator headset is configured to receive the detection signal directly from the detection head and information relating to the operating mode of the device from the command and control box.

* * * * *